(12) United States Patent
Perla et al.

(10) Patent No.: US 9,395,041 B2
(45) Date of Patent: Jul. 19, 2016

(54) SMALL FRAME CRAWLER SYSTEM

(71) Applicant: The Boeing Company, Chicago, IL (US)

(72) Inventors: Luis A. Perla, Sammamish, WA (US); Clayton Lynn Munk, Maple Valley, CA (US); Stephen Glade Holley, Gig Harbor, WA (US)

(73) Assignee: THE BOEING COMPANY, Chicago, IL (US)

( * ) Notice: Subject to any disclaimer, the term of this patent is extended or adjusted under 35 U.S.C. 154(b) by 269 days.

(21) Appl. No.: 13/893,959

(22) Filed: May 14, 2013

(65) Prior Publication Data

US 2014/0339394 A1   Nov. 20, 2014

(51) Int. Cl.
| | |
|---|---|
| *F16M 13/02* | (2006.01) |
| *B23Q 9/02* | (2006.01) |
| *B21J 15/02* | (2006.01) |
| *B23K 37/02* | (2006.01) |
| *B23Q 9/00* | (2006.01) |
| *B23K 31/02* | (2006.01) |

(Continued)

(52) U.S. Cl.
CPC ............. *F16M 13/022* (2013.01); *B21J 15/02* (2013.01); *B23K 31/02* (2013.01); *B23K 37/0223* (2013.01); *B23K 37/0282* (2013.01); *B23K 37/0294* (2013.01); *B23Q 9/0007* (2013.01); *B23Q 9/0042* (2013.01); *B23Q 9/02* (2013.01); *B21J 15/105* (2013.01); *B21J 15/142* (2013.01); *B23K 2201/18* (2013.01); *B23K 2201/24* (2013.01); *B23P 19/04* (2013.01); *B23P 2700/01* (2013.01); *F16C 29/004* (2013.01); *Y10T 29/49622* (2015.01); *Y10T 29/49947* (2015.01); *Y10T 29/53* (2015.01); *Y10T 29/53983* (2015.01); *Y10T 408/03* (2015.01); *Y10T 408/89* (2015.01)

(58) Field of Classification Search
CPC .......... B21J 15/02; B21J 15/105; B21J 15/12; B21J 15/142; B21J 15/30; B23P 11/00; B23P 15/00; B23P 17/00; B23P 19/00; B23P 19/04; B23P 2700/01; B23Q 9/0007; B23Q 9/0014; B23Q 9/0042; B23Q 9/02; F16M 13/022; Y10T 29/49956; Y10T 29/49957; Y10T 29/5377; Y10T 29/53774; Y10T 29/53983; Y10T 29/49622; B23K 37/0294; B23K 37/0282; B23K 31/02; B23K 37/0223; B23K 2201/18; B23K 2201/24
See application file for complete search history.

(56) References Cited

U.S. PATENT DOCUMENTS

| | | |
|---|---|---|
| 5,307,979 A | 5/1994 | Kim |
| 5,468,099 A | 11/1995 | Wheetley et al. |

(Continued)

OTHER PUBLICATIONS

"Hevi-Rail Roller Bearings", PBC Linear, accessed Oct. 7, 2015, available to public Mar. 2012, http://www.pbclinear.com/Hevi-Rail-Roller-Bearings---Eccentric-Adjustable-Axial-Bearing.*

(Continued)

*Primary Examiner* — Ryan J Walters
*Assistant Examiner* — Matthew P Travers
(74) *Attorney, Agent, or Firm* — Yee & Associates, P.C.

(57) ABSTRACT

A method and apparatus for performing an operation on a structure. In one illustrative embodiment, an apparatus comprises a tool system and a movement system. The tool system is configured to perform an operation at a location on a structure. The movement system is configured to move the tool system along an elongate frame on the structure to the location.

30 Claims, 12 Drawing Sheets

(51) Int. Cl.
  *B23P 19/04* (2006.01)
  *B21J 15/10* (2006.01)
  *B21J 15/14* (2006.01)
  *F16C 29/00* (2006.01)

(56) References Cited

U.S. PATENT DOCUMENTS

| | | |
|---|---|---|
| 5,562,043 A | 10/1996 | Gromes |
| 6,467,385 B1 | 10/2002 | Buttrick et al. |
| 6,926,094 B2 * | 8/2005 | Arntson et al. ............... 173/32 |
| 8,272,814 B2 | 9/2012 | Buttrick, Jr. et al. |
| 8,301,302 B2 | 10/2012 | Sarh et al. |
| 2004/0234352 A1 | 11/2004 | Vanderpol et al. |
| 2004/0265077 A1 | 12/2004 | Boyl-Davis et al. |
| 2007/0151375 A1 * | 7/2007 | Kennedy et al. ............. 73/866.5 |
| 2010/0122444 A1 * | 5/2010 | Reid et al. ................. 29/243.54 |
| 2011/0243676 A1 * | 10/2011 | Marguet et al. ............. 408/72 R |
| 2012/0114439 A1 | 5/2012 | Buttrick et al. |

OTHER PUBLICATIONS

International Search Report and Written Opinion, dated Oct. 9, 2014, regarding Application No. PCT/US2014/034897, 14 pages.

* cited by examiner

SMALL FRAME CRAWLER SYSTEM

BACKGROUND INFORMATION

1. Field

The present disclosure relates generally to manufacturing and, in particular, to performing operations on structures to manufacture an object. Still more particularly, the present disclosure relates to a method and apparatus for performing operations on structures to manufacture an object using a moving platform.

2. Background

In manufacturing aircraft, many parts may be fabricated and assembled to form the aircraft. For example, the fuselage of an aircraft may be formed by manufacturing structures such as frames and skin panels. The skin panels may be attached to the frames using fasteners.

The attachment of skin panels to the frames may involve many different types of operations. For example, drilling operations may be performed to form holes for use in connecting skin panels to the frames. In another example, fasteners may be installed in the holes to connect the skin panels to the frames.

The assembly of parts may be performed in a number of different ways. For example, human operators may perform the different operations to form holes and install fasteners to connect skin panels to the frames. With human operators, the process may be labor intensive, more complex, and more time-consuming than desired.

When human operators are employed, platforms, jigs, fixtures, scaffolding, gantry systems, and other components may be set up and used to perform operations such as positioning skin panels with respect to frames, drilling holes, installing fasteners, and other operations.

The assembly of these parts also may be performed using automated equipment. For example, robotic equipment may be used to form holes and install fasteners. The automated equipment may often be larger than desired. In some cases, the size of the automated equipment, such as robotic arms or other bulky equipment, may reduce the ability to perform some operations in connecting skin panels to frames to form a fuselage of the aircraft.

Robotic equipment may also include crawlers that move on tracks. These tracks may be attached to the fuselage panels positioned relative to the frames. A crawler may move on the track to perform operations such as drilling operations and fastener installation operations.

Crawlers on tracks may not be as bulky as other types of robotic equipment. However, the use of tracks may require the drilling of additional holes for attaching the tracks to the fuselage. Additionally, the use of tracks may require more time and effort than desired to install and remove these types of systems to perform operations on the fuselage of an aircraft.

Therefore, it would be desirable to have a method and apparatus that take into account at least some of the issues discussed above, as well as other possible issues.

SUMMARY

In one illustrative embodiment, an apparatus may comprise a tool system and a movement system. The tool system may be configured to perform an operation at a location on a structure. The movement system may be configured to move the tool system along an elongate frame on the structure to the location.

In another illustrative embodiment, a method for performing an operation on a structure may be provided. A tool system physically associated with a movement system may be moved along an elongate frame on the structure to a location. The operation may be performed on the structure at the location with the tool system.

In yet another illustrative example, a mobile tool system may comprise a first crawler, a second crawler, a connector, and a third tool. The first crawler may be configured to be attached to a first elongate frame in which the first crawler may comprise a first movement system and a first tool system. The second crawler system may be configured to be attached to a second elongate frame that may be substantially parallel to the first elongate frame in which the second crawler may comprise a second movement system and a second tool. The connector may be configured to connect the first crawler and the second crawler to each other. The third tool may be configured to move along the connector longitudinally between the first crawler and the second crawler.

In still yet another illustrative embodiment, a mobile tool system may comprise a crawler and a controller. The crawler may comprise a tool system, a movement system, and a support system. The tool system may be configured to perform an operation at a location on a structure for a fuselage of an aircraft in which the tool system may be comprised of at least one of a fastener installer, a drill, a paint applicator, a sealant applicator, or a camera. The movement system may be configured to move the tool system along an elongate frame on the structure to the location. The movement system may comprise a locomotion system configured to move along the elongate frame and an attachment system configured to attach the locomotion system to the elongate frame in which the locomotion system may have a number of rollers configured to contact the elongate frame and a number of motors configured to turn at least one of the number of rollers such that the movement system and the tool system move along the elongate frame and in which the attachment system may be selected from at least one of a physical clamping system or a magnetic attachment system. The tool system and the movement system may be physically associated with the support frame. The controller may be configured to control operation of the crawler.

In still yet another illustrative embodiment, a method for performing an operation on a structure in a fuselage of an aircraft may be provided. A movement system in a crawler may be attached to an elongate frame in which the movement system moves on the elongate frame. The movement system may be physically associated with a tool system in the crawler. The tool system and the movement system may be physically associated with a support frame for the crawler. The movement system may comprise a locomotion system configured to move along the elongate frame and an attachment system configured to attach the locomotion system to the elongate frame. The locomotion system may have a number of rollers configured to contact the elongate frame and a number of motors configured to turn at least one of the number of rollers such that the movement system and the tool system move along the elongate frame. The attachment system may be selected from at least one of a physical clamping system or a magnetic attachment system. The tool system may be comprised of at least one of a fastener installer, a drill, a paint applicator, a sealant applicator, or a camera. The tool system physically associated with the movement system may be moved along the elongate frame on the structure to a location. The operation may be performed on the structure at the location with the tool system. The operation may be selected from one of a fastener installation operation, a drilling operation, a sealing operation, a painting operation, or an inspection operation.

In a further illustrative embodiment, a mobile tool system may comprise a first crawler, a second crawler, a connector and a tool. The first crawler may be configured to be attached to a first elongate frame. The second crawler may be configured to be attached to a second elongate frame that may be substantially parallel to the first elongate frame. The connector may be configured to connect the first crawler and the second crawler to each other. The tool may be configured to move along the connector longitudinally between the first crawler and the second crawler.

In yet a further illustrative embodiment, a mobile tool system may comprise a first attachment device, a second attachment device, a connector, and a tool. The first attachment device may be configured to be attached to a first elongate frame. The second attachment device may be configured to be attached to a second elongate frame that is substantially parallel to the first elongate frame. The connector may be configured to connect the first attachment device and the second attachment device to each other. The tool may be configured to move along the connector longitudinally between the first attachment device and the second attachment device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that moving platforms such as crawlers may have a size that is sufficiently small to perform many different operations in assembling parts for an aircraft. The illustrative embodiments also recognize and take into account that the use of tracks attached to the different structures on which operations are performed may be undesirable.

Thus, the illustrative embodiments provide a method and apparatus for performing different operations using moving platforms such as crawlers. In one illustrative embodiment, an apparatus may comprise a tool system and a movement system. The tool system may be configured to perform an operation at a location on a structure. The movement system may be configured to move the tool system along an elongate frame physically associated with the structure to the location.

Figure 1:
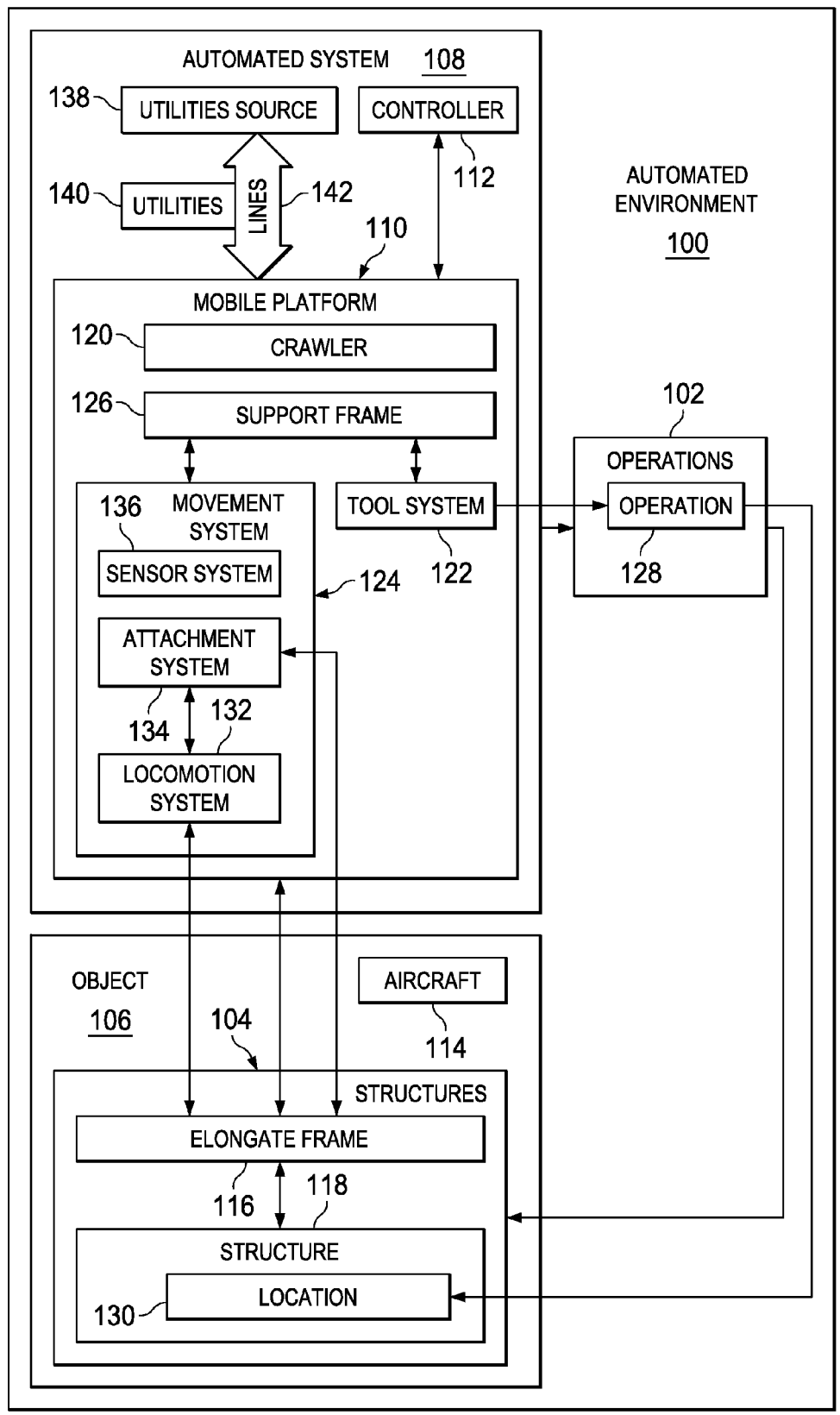
FIG. 1 is an illustration of a block diagram of an automated environment in accordance with an illustrative embodiment.

With reference now to the figures and, in particular, with reference to FIG. 1, an illustration of a block diagram of an automated environment is depicted in accordance with an illustrative embodiment. In this illustrative example, automated environment 100 may be an environment in which operations 102 may be performed on structures 104 to manufacture object 106.

Operations 102 may be performed on structures using automated system 108. In this illustrative example, automated system 108 may include mobile platform 110 and controller 112.

As depicted, mobile platform 110 in automated system 108 may be configured to perform operations 102 on structures 104 to form object 106. In this illustrative example, object 106 may be aircraft 114. Mobile platform 110 may be a mobile tool system.

In this illustrative example, mobile platform 110 may be configured to be attached to elongate frame 116 on structure 118 in structures 104. Elongate frame 116 may be configured to provide structural support for structure 118 or other structures in structures 104. Elongate frame 116 may be straight, curved, or have some other shape depending on the particular implementation. Elongate frame 116 also may be configured to provide guidance on mobile platform 110. Structure 118, may be, for example, a flange on elongate frame 116, a skin panel, a spar, a rib, a stringer, or other suitable structures.

In the illustrative example, mobile platform 110 may move on elongate frame 116 and perform operations 102 on at least one of elongate frame 116 and structure 118. In this illustrative example, mobile platform 110 may take the form of crawler 120.

Mobile platform 110 may be comprised of one or more different components. For example, mobile platform 110 may be comprised of tool system 122, movement system 124, and support frame 126.

In the illustrative example, tool system 122 is configured to perform operation 128 in operations 102 at location 130 on structure 118. Operation 128 may take various forms. For example, operation 128 may be selected from one of a fastener installation operation, a drilling operation, a sealing operation, a painting operation, inspection operation, or other suitable types of operations.

Tool system 122 may include a group of tools. As used herein, "a group of," when used with reference to items, means one or more items. For example, a group of tools is one or more tools. As depicted, tool system 122 may include at least one of a fastener installer, a drill, a paint applicator, a sealant applicator, a camera, or some other suitable type of tool. In these illustrative examples, a tool within tool system 122 may be removably attached to support frame 126. The particular tool selected for tool system 122 may depend on operation 128.

Movement system 124 may be configured to move tool system 122 along elongate frame 116 on structure 118 to location 130. In these illustrative examples, movement system 124 may include locomotion system 132, attachment system 134, and sensor system 136.

Locomotion system 132 may be configured to move mobile platform 110 along elongate frame 116. Attachment system 134 may be configured to attach locomotion system 132 to elongate frame 116. In these illustrative examples, attachment system 134 may take various forms. For example, attachment system 134 may be at least one of a physical clamping system, a magnetic attachment system, or some other suitable type of attachment system.

In this illustrative example, tool system 122 may be physically associated with movement system 124. When one component is "physically associated" with another component, the association is a physical association in the depicted examples. For example, a first component, movement system 124, may be considered to be physically associated with a second component, tool system 122, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both.

As depicted, tool system 122, movement system 124, and sensor system 136 may be physically associated with support frame 126. Support frame 126 may take various forms. For example, support frame 126 may be a housing, a rigid structure, or some other type of structure suitable for being associated with tool system 122 and movement system 124. Further, in these illustrative examples, at least one of tool system 122 and movement system 124 may be removably connected to support frame 126 in being physically associated with support frame 126.

As depicted, sensor system 136 may be used to determine when mobile platform 110 has reached location 130 to perform operation 128. Sensor system 136 may include at least one of an encoder, a camera, an ultrasonic sensor, or other suitable types of sensor devices.

As depicted, controller 112 may be configured to control mobile platform 110 in performing operations 102. In particular, controller 112 may control tool system 122 and movement system 124 in these illustrative examples. As depicted, controller 112 may receive data from sensor system 136 at location 130 to perform operation 128.

In the illustrative example, controller 112 may be implemented in software, hardware, firmware or a combination thereof. When software is used, the operations performed by controller 112 may be implemented in program code configured to run on a processor unit. When firmware is used, the operations performed by controller 112 may be implemented in program code and data and stored in persistent memory to run on a processor unit. When hardware is employed, the hardware may include circuits that operate to perform the operations in controller 112.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In these illustrative examples, controller 112 may be implemented in a computer system, in mobile platform 110, or some combination thereof. A computer system may be one or more computers. When the computer system includes more than one computer, those computers maybe in communication with each other through a communications medium, such as a network.

In this illustrative example, automated system 108 also may include utilities source 138. Utilities source 138 may provide utilities 140 to mobile platform 110 through lines 142. In these illustrative examples, utilities 140 may take various forms. For example, without limitation, utilities 140 may include at least one of power, pressurized air, fluids, supplies for tool system 122, or other suitable utilities. Lines 142 also may take different forms. For example, lines 142 may include at least one of wires, optical cables, fluid lines, or other suitable types of lines.

The illustration of automated environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative example in FIG. 1 has described object 106 as aircraft 114, object 106 may take other forms. For example, object 106 may be selected from one of a mobile platform, a stationary platform, a land-based structure, an aquatic-based structure, a space-based structure, or some other suitable type of object. In particular, object 106 may be selected from one of a surface ship, a tank, a personnel carrier, a train, a spacecraft, a space station, a satellite, a submarine, an automobile, a power plant, a bridge, a dam, a house, a manufacturing facility, a building, or some other suitable type of object.

In some illustrative examples, operation 128 may be performed on elongate frame 116 in addition to or in place of structure 118. In yet another illustrative example, sensor system 136 may be omitted from mobile platform 110. Instead, a human operator may provide input to controller 112 to determine when to perform operation 128 at location 130. In still another illustrative example, sensor system 136 may be physically connected to support frame 126 through another component, such as tool system 122 or movement system 124, rather than being directly connected to support frame 126.

In another illustrative example, mobile platform 110 may include one or more additional crawlers in addition to crawler 120. These crawlers may be connected to each other through a connector. The connector may be any structure that physically connects the crawlers to each other. The structure may be rigid or non-rigid depending on the particular implementation.

Figure 2:
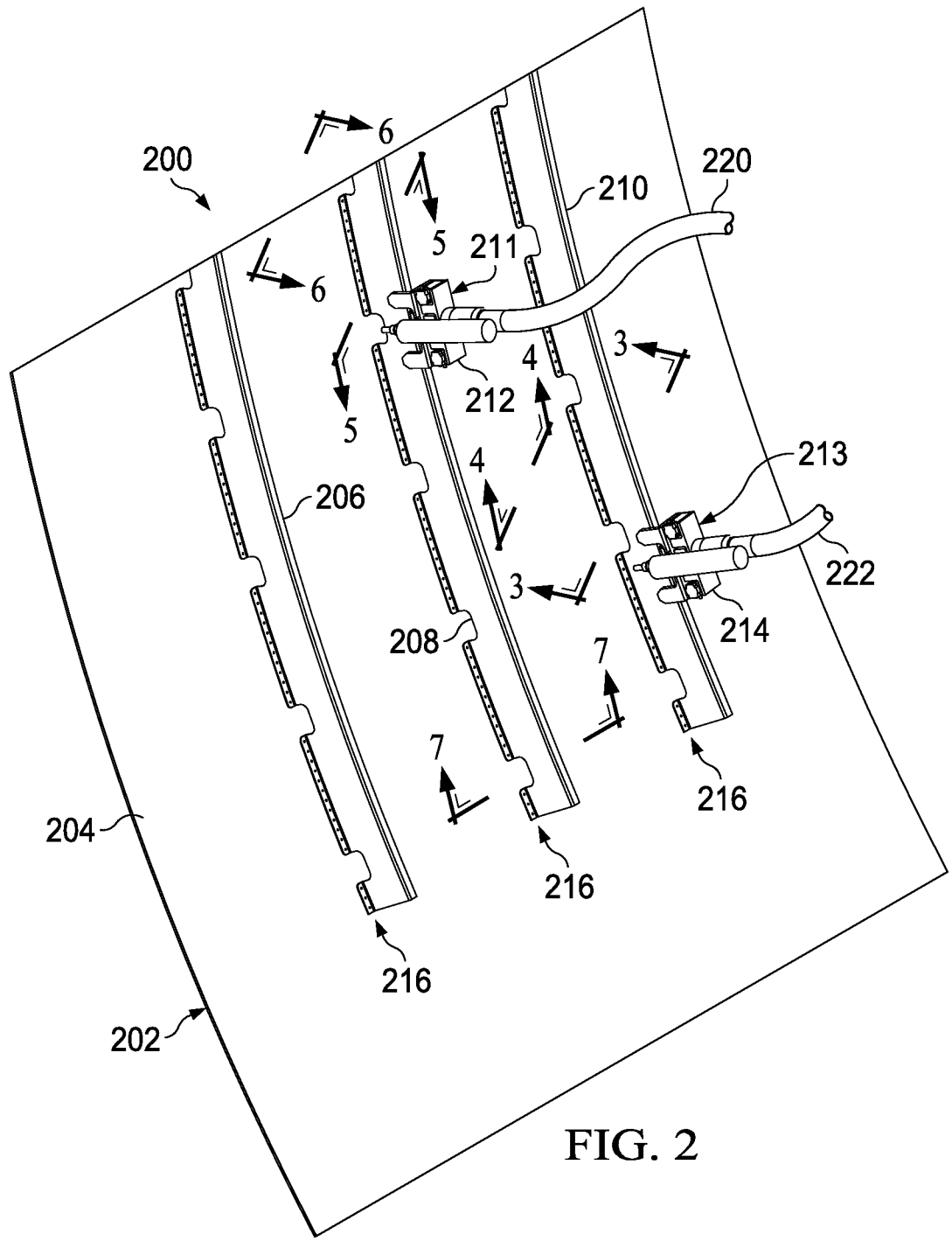
FIG. 2 is an illustration of an automated environment in accordance with an illustrative embodiment.

With reference next to FIG. 2, an illustration of an automated environment is depicted in accordance with an illustrative embodiment. In this depicted example, automated environment 200 is an example of one implementation for automated environment 100 shown in block form in FIG. 1.

As depicted, structures 202 are examples of physical implementations for structures 104 in FIG. 1. As depicted, structures 202 may be comprised of various types of materials. For example, structures 202 may be comprised of at least one of a metal, aluminum, steel, titanium, a composite material, or some other suitable type of material.

In this particular example, structures 202 may include skin panel 204, elongate frame 206, elongate frame 208, and elongate frame 210. As shown, skin panel 204, elongate frame 206, elongate frame 208, and elongate frame 210 are curved. Of course, in other illustrative examples, these structures may be substantially straight or planar.

In the illustrative example, mobile platform 211 may be crawler 212 and mobile platform 213 may be crawler 214. Crawler 212 and crawler 214 may perform operations on skin panel 204. In particular, crawler 212 and crawler 214 may perform operations including installing fastener elements (not shown), such as collars (not shown) to bolts 216, to secure elongate frame 206, elongate frame 208, and elongate frame 210 to skin panel 204. As depicted, bolts 216 extend through skin panel 204 and through elongate frame 206, elongate frame 208, and elongate frame 210.

As depicted, elongate frame 208 acts as a track on which crawler 212 may move to perform fastening operations. In a similar fashion, elongate frame 210 also may act as a track on which crawler 214 may move to perform fastening operations. In other words, crawler 214 may perform operations on skin panel 204. In other words, a specialized track does not need to be attached to skin panel 204 to perform fastening operations. Further, even if a specialized track were available, difficulty may be present in performing fastening operations due to the locations on which fasteners may be located on skin panel 204 with respect to elongate frame 206, elongate frame 208, and elongate frame 210.

As depicted, crawler 212 is connected to lines 220 and crawler 214 is connected to lines 222. These lines may be examples of implementations for lines 142 shown in block form in FIG. 1. The lines may carry utilities, such as utilities 140 in FIG. 1.

Figure 3:
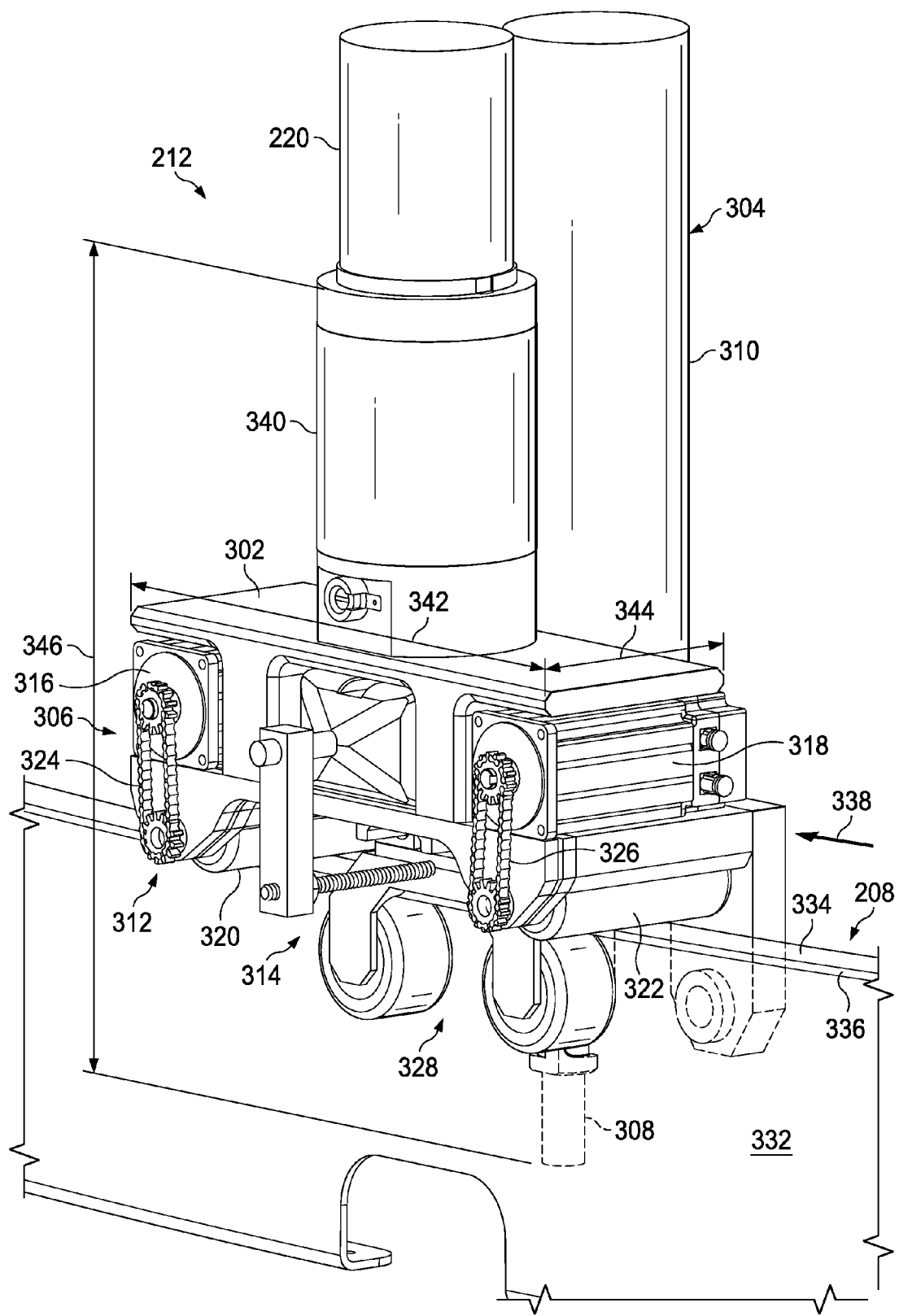
FIG. 3 is an illustration of a crawler on an elongate frame in accordance with an illustrative embodiment.

Turning now to FIG. 3, an illustration of a crawler on an elongate frame is depicted in accordance with an illustrative embodiment. As illustrated, an isometric view of crawler 212 on elongate frame 208 from a cross-section taken along lines 3-3 in FIG. 2 is shown. In this depicted example, crawler 212 may be an example of one implementation for crawler 120 in FIG. 1. In this illustrative example, elongate frame 208 is shown in phantom to better illustrate different features of crawler 212.

In this illustrative example, crawler 212 may have a number of different components. As depicted, crawler 212 may include support frame 302, tool system 304, and movement system 306. As can be seen, movement system 306 and tool system 304 may be connected to support frame 302.

Support frame 302 may provide a structure to which tool system 304 and movement system 306 may be connected. Support frame 302 may be comprised of various materials. For example, support frame 302 may be comprised of a material selected from at least one of a metal, aluminum, steel, plastic, polycarbonate, a composite material or other suitable materials.

Tool system 304 is an example of an implementation for tool system 122 shown in block form in FIG. 1. Tool system 304 may include fastener installer 308 and supply unit 310. Supply unit 310 may be connected to fastener installer 308. As depicted, supply unit 310 may hold and supply fasteners, such as collars (not shown), to fastener installer 308 for use in installing fasteners.

In the illustrative example, movement system 306 may include one or more different components. For example, movement system 306 may comprise locomotion system 312 and attachment system 314.

As depicted, locomotion system 312 may include a number of different components. For example, locomotion system 312 may include a number of motors such as motor 316 and motor 318. Further, locomotion system 312 also may include a number of rollers, such as, roller 320 and roller 322. "A number of," as used herein with reference to items, means one or more items. For example, a number of motors is one or more motors.

As depicted, chain 324 may connect motor 316 to roller 320. Chain 326 may connect motor 318 to roller 322.

Attachment system 314 may be an example of one implementation of attachment system 134 shown in block form in FIG. 1. In this illustrative example, attachment system 314 may take the form of clamping system 328. Clamping system 328 may attach crawler 212 to elongate frame 208 shown in phantom.

In this example, elongate frame 208 may be comprised of section 332 and flange 334. Section 332 may extend from a surface of a structure (not shown) in which the section is substantially perpendicular to the surface of the structure. As depicted, flange 334 may extend from edge 336 of section 332. As can be seen, flange 334 may be substantially perpendicular to edge 336 of section 332.

Attachment system 314 may be configured to attach crawler 212 to an elongate frame 208. In this particular configuration, attachment system 314 may attach locomotion system 312 to elongate frame 208.

When locomotion system 312 is connected to elongate frame 208, locomotion system 312 may operate to move crawler 212. In this illustrative example, locomotion system 312 may move crawler 212 in the direction of arrow 338 on elongate frame 208.

In the illustrative examples, utilities conduit 340 is connected to support frame 302. Utilities conduit 340 may receive lines for various utilities. These utilities may include, for example, electrical power, pressurized air, fluids, or other suitable items.

As depicted, crawler 212 has length 342, width 344, and height 346. In this illustrative example, length 342 may be about 10 inches, width 344 may be about 3 inches, and height 346 may be about 14 inches. Further, with this size, the weight of crawler 212 may be less than various types of crawlers that are currently used with tracks or rails that are removably attached to the fuselage.

Figure 4:
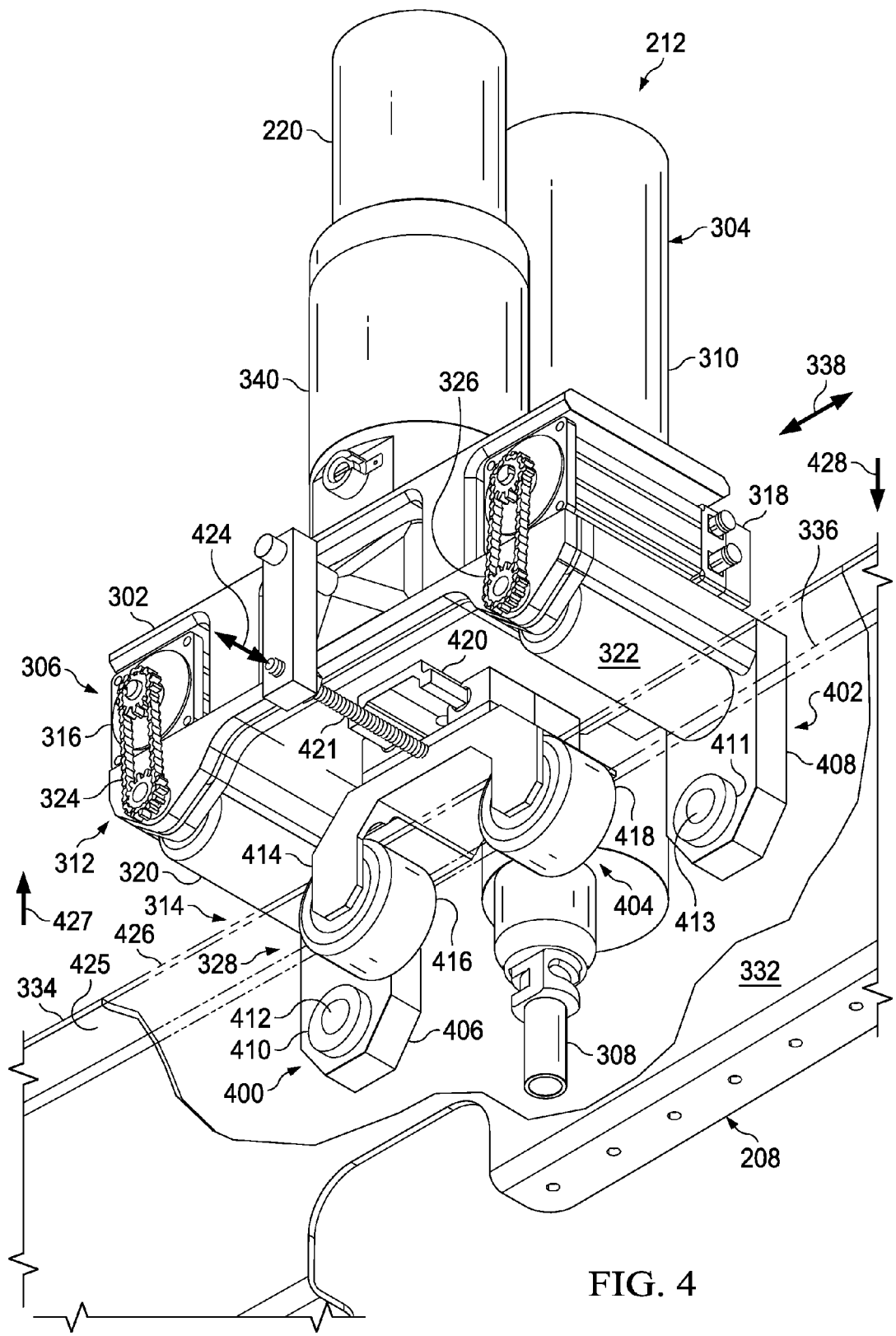
FIG. 4 is another illustration of a crawler on an elongate frame in accordance with an illustrative embodiment.

Turning next to FIG. 4, another illustration of a crawler on an elongate frame is depicted in accordance with an illustrative embodiment. Another isometric view of crawler 212 is shown. In this view, crawler 212 is seen in the direction of lines 4-4 in FIG. 3.

A better view of clamping system 328 may be seen in this view. As depicted, clamping system 328 may take the form of ball transfer clamp 400. Clamping system 328 may comprise first guide 402, second guide 404, and engagement system 405. First guide 402 may be opposite of second guide 404.

As illustrated, first guide 402 may comprise structure 406 and structure 408. Additionally, first guide 402 also may include bearing 410 on structure 406 and bearing 411 on structure 408. As can be seen in this view, bearing 410 may be comprised of sphere 412, and bearing 411 may be comprised of sphere 413.

Second guide 404 may comprise structure 414 with wheel assembly 416 and wheel assembly 418. Additionally, engagement system 405 may include rail 420 and screw drive 421. Screw drive 421 may move second guide 404. As depicted, screw drive 421 may move structure 414 along rail 420 in the direction of arrow 424 in this illustrative example. This movement may engage or disengage second guide 404 from elongate frame 208.

Structure 414 may be configured to place wheel assembly 416 and wheel assembly 418 in contact with section 332 of elongate frame 208. Additionally, bearing 410 and bearing 411 in first guide 402 also may contact section 332 of elongate frame 208 opposite of second guide 404.

As can be seen in this illustrative example, clamping system 328 may contact bottom side 425 of flange 334. In particular, wheel assembly 416 and wheel assembly 418 may contact bottom side 425 of flange 334 when clamping system 328 moves in the direction of arrow 427.

When clamping system 328 is engaged, roller 320 and roller 322 contact topside 426 of flange 334. Clamping system 328 may cause force in the direction of arrow 428 such that roller 320 and roller 322 may maintain contact with topside 426 of flange 334 for different orientations of elongate frame 208. In other words, clamping system 328 may allow locomotion system 312 to move crawler 212 along flange 334 for different orientations of elongate frame 208.

Figure 5:
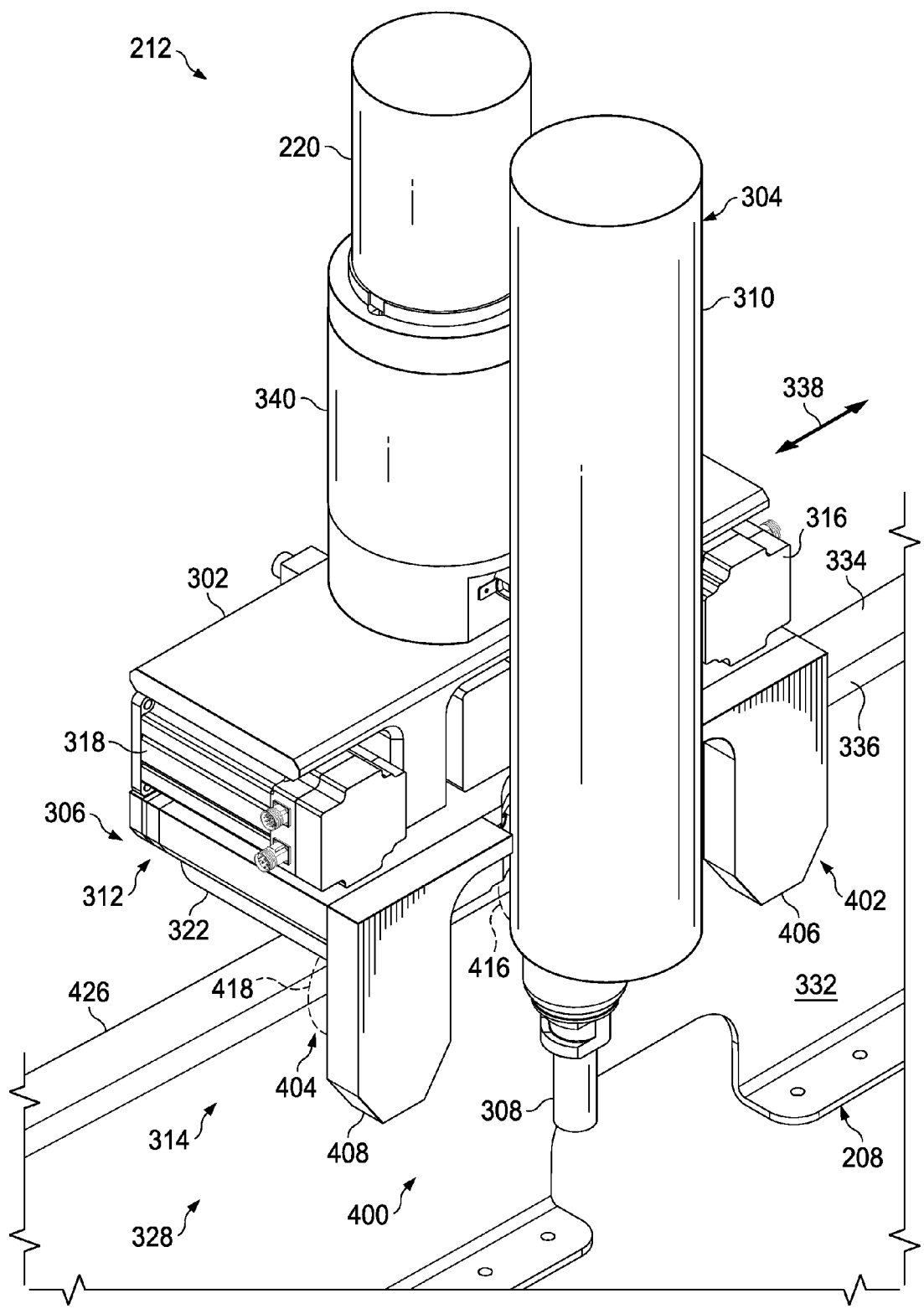
FIG. 5 is another illustration of a crawler on an elongate frame in accordance with an illustrative embodiment.

With reference next to FIG. 5, yet another illustration of a crawler on an elongate frame is depicted in accordance with an illustrative embodiment. As depicted, an isometric perspective view of crawler 212 is depicted as seen in the direction of lines 5-5 in FIG. 3.

Figure 6:
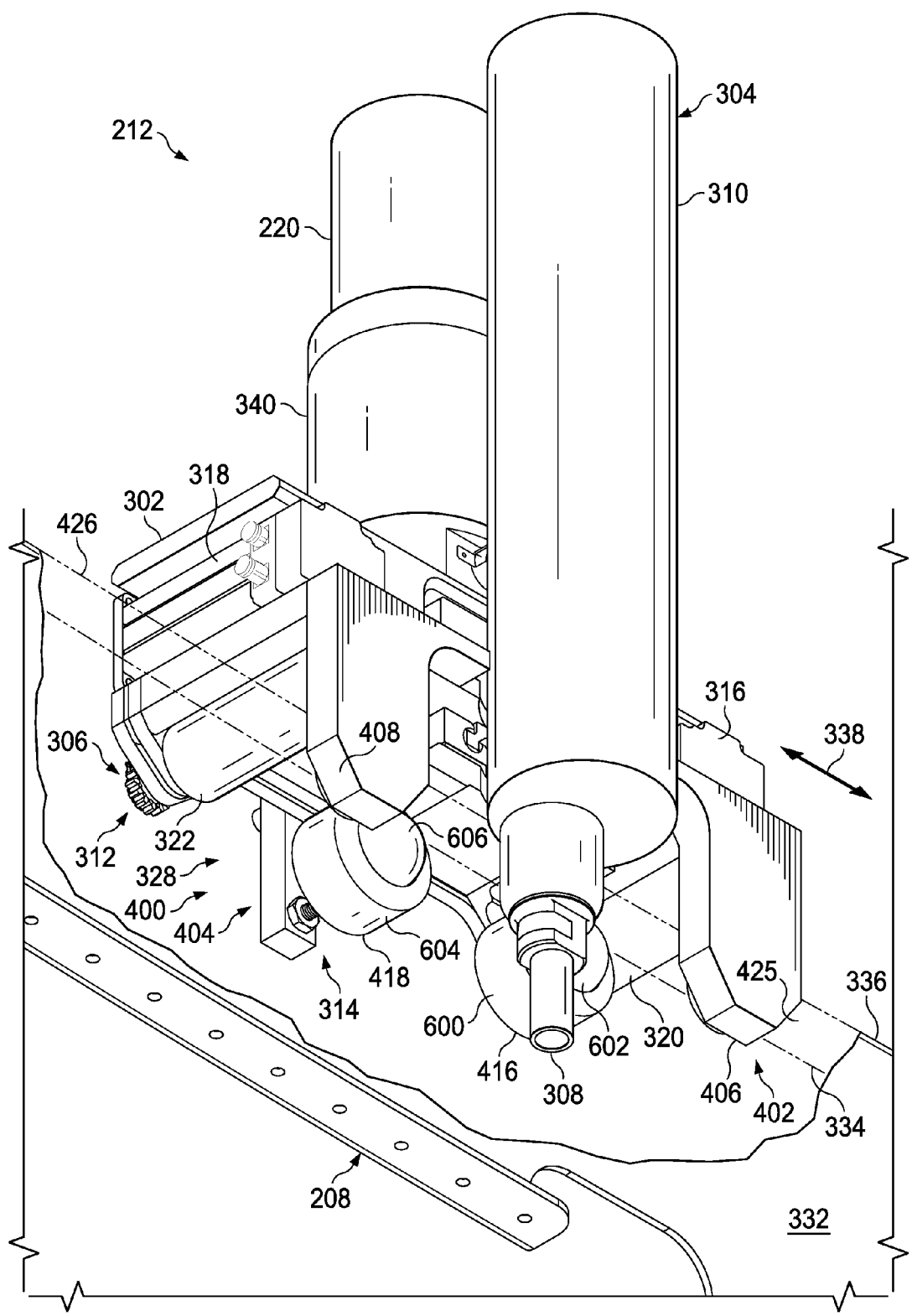
FIG. 6 is yet another illustration of a crawler on an elongate frame in accordance with an illustrative embodiment.

In FIG. 6, still another illustration of a crawler on an elongate frame is depicted in accordance with an illustrative embodiment. In this figure, a perspective of a bottom side of crawler 212 is seen in the direction of lines 6-6 in FIG. 3.

In this view, wheel assembly 416 may be comprised of wheel 600 and sphere 602. Wheel assembly 418 may be comprised of wheel 604 and sphere 606.

Figure 7:
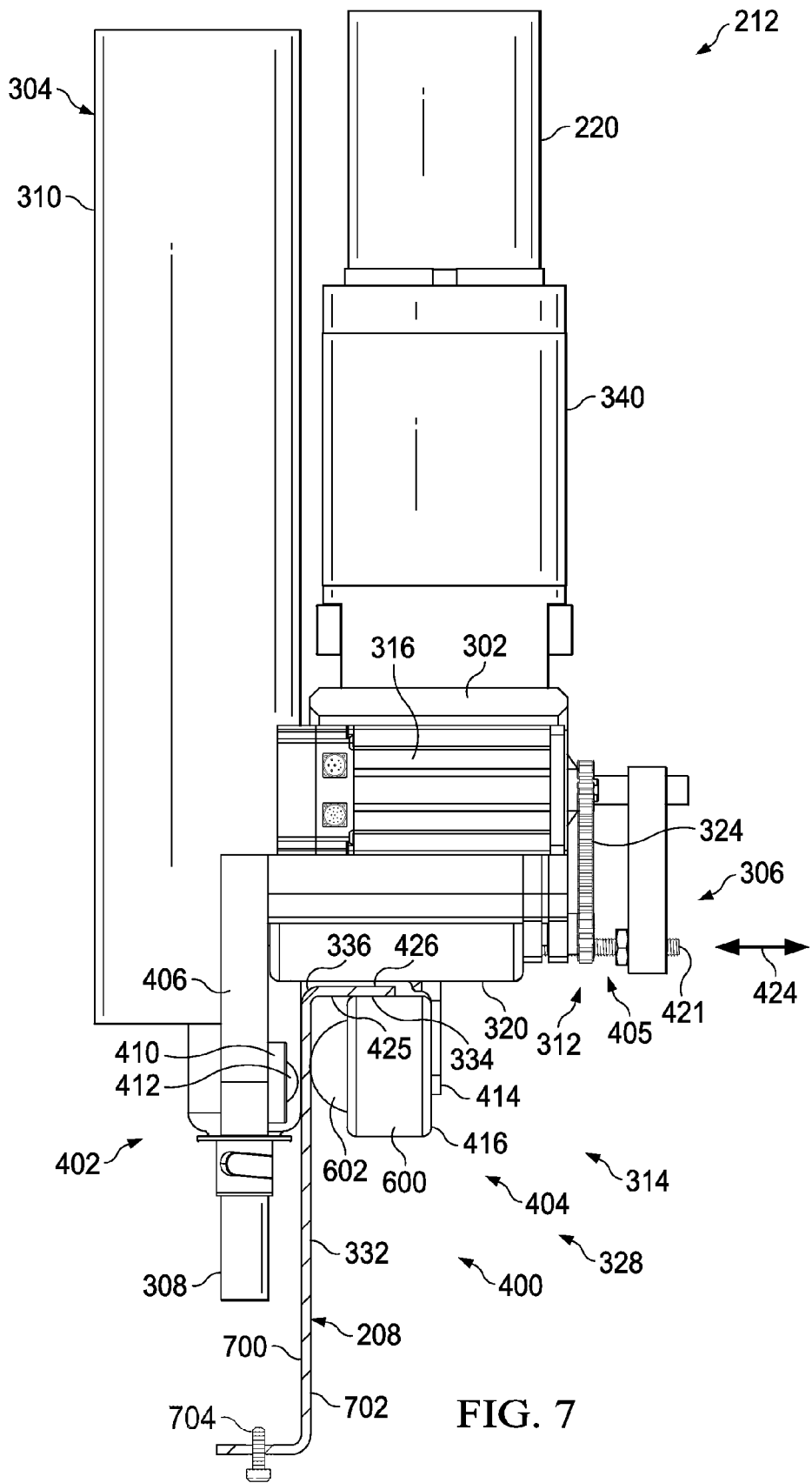
FIG. 7 is still another illustration of a crawler on an elongate frame in accordance with an illustrative embodiment.

In FIG. 7, still another illustration of a crawler on an elongate frame is depicted in accordance with an illustrative embodiment. In this figure, a side view of crawler 212 is seen in the direction of lines 7-7 in FIG. 3.

In this view, bearing 410 is shown contacting first side 700 of section 332 of elongate frame 208. Wheel assembly 416 is shown contacting bottom side 425 of flange 334 and second side 702 of section 332.

As seen in this illustrative example, wheel assembly 416 in this engaged position may cause roller 320 to maintain contact with topside 426 of flange 334 as roller 320 turns to move crawler 212 on flange 334 of elongate frame 208. As depicted, fastener installer 308 in tool system 304 may install a collar (not shown) to bolt 704 extending through skin panel 204 and elongate frame 208.

In this illustrative example, crawler 212 may be considered a small frame crawler. In other words, crawler 212 may have a size that is smaller than other types of crawlers that may be used on rails or tracks that are removably attached to a structure and are not used for other purposes other than to provide support in a guide for the crawler.

Illustrations of crawler 212 in FIGS. 3-7 are not meant to imply limitations to the manner in which mobile platform 110 and, in particular, crawler 120 shown in block form in FIG. 1 may be implemented. Many various modifications and changes may be made to crawler 212 in accordance with an illustrative embodiment. For example, tool system 304 may omit supply unit 310. In some illustrative examples, fasteners may be supplied to fastener installer 308 through a line attached to utilities conduit 340.

In still another illustrative example, another tool may be used in place of or in addition to fastener installer 308 in tool system 304. For example, a drill may be used in place of fastener installer 308. In some illustrative examples, other tools such as a drill, a paint applicator, a sealant applicator, a camera, or some other tool may be used in place of fastener installer 308 in various combinations.

In yet another illustrative example, motor 316 and motor 318 may be directly connected to roller 320 and roller 322 without chain 324 and chain 326. In still other illustrative examples, motor 318 may be omitted. In still other illustrative examples, at least one of wheel assembly 416 and wheel assembly 418 may be motorized to provide movement of crawler 212. In other words, locomotion system 312 in attachment system 314 may be integrated.

Figure 8:
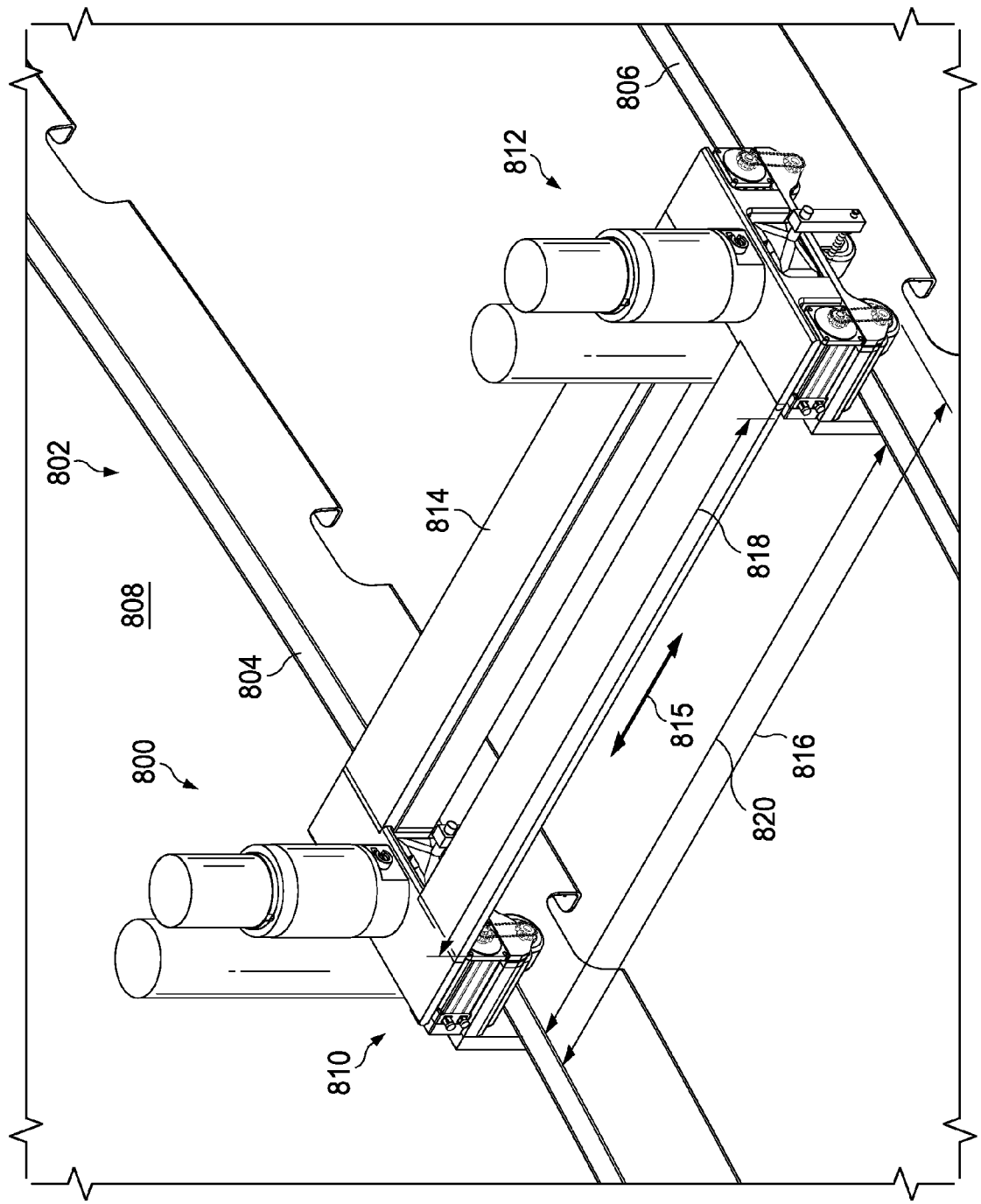
FIG. 8 is an illustration of a mobile platform in accordance with an illustrative embodiment.

Turning next to FIG. 8, an illustration of a mobile platform is depicted in accordance with an illustrative embodiment. In this illustrative example, mobile platform 800 in automated environment 802 is depicted as attached to elongate frame 804 and elongate frame 806. Elongate frame 804 and elongate frame 806 may be attached to skin panel 808. Elongate frame 804 and elongate frame 806 may be temporarily attached such that fasteners (not shown) may be installed.

In this illustrative example, mobile platform 800 may be comprised of crawler 810, crawler 812, and connector 814. Crawler 810 and crawler 812 may be examples of crawler 120 shown in block form in FIG. 1. In particular, crawler 810 and crawler 812 may be implemented using crawler 212 in FIG. 3.

As depicted, connector 814 may connect crawler 810 and crawler 812 to each other to form mobile platform 800. In this illustrative example, connector 814 may be rigid. Connector 814 may be comprised of a material such as, for example, without limitation, a material selected from at least one of a metal, aluminum, steel, titanium, plastic, polycarbonate, ceramic, a composite material, or some other suitable type of material.

In these illustrative examples, the use of connector 814 with crawler 810 and crawler 812 may provide for additional rigidity in mobile platform 800. Additionally, movement perpendicular to the frame in direction of arrow 815 may be reduced.

As depicted, mobile platform 800 may have width 816 with connector 814 having length 818. Width 816 of mobile platform 800 may be, for example, without limitation, about 30 inches. Length 818 of connector 814 may be about 24 inches. Of course, width 816 and length 818 may depend on distance 820 between elongate frame 804 and elongate frame 806.

Connector 814 may be replaced with another connector having a different length from length 818 if mobile platform 800 is used with elongate frames having a different distance separating the elongate frames. In this manner, additional flexibility may be present in using mobile platform 800 with elongate frames having different distances between the elongate frames.

Figure 9:
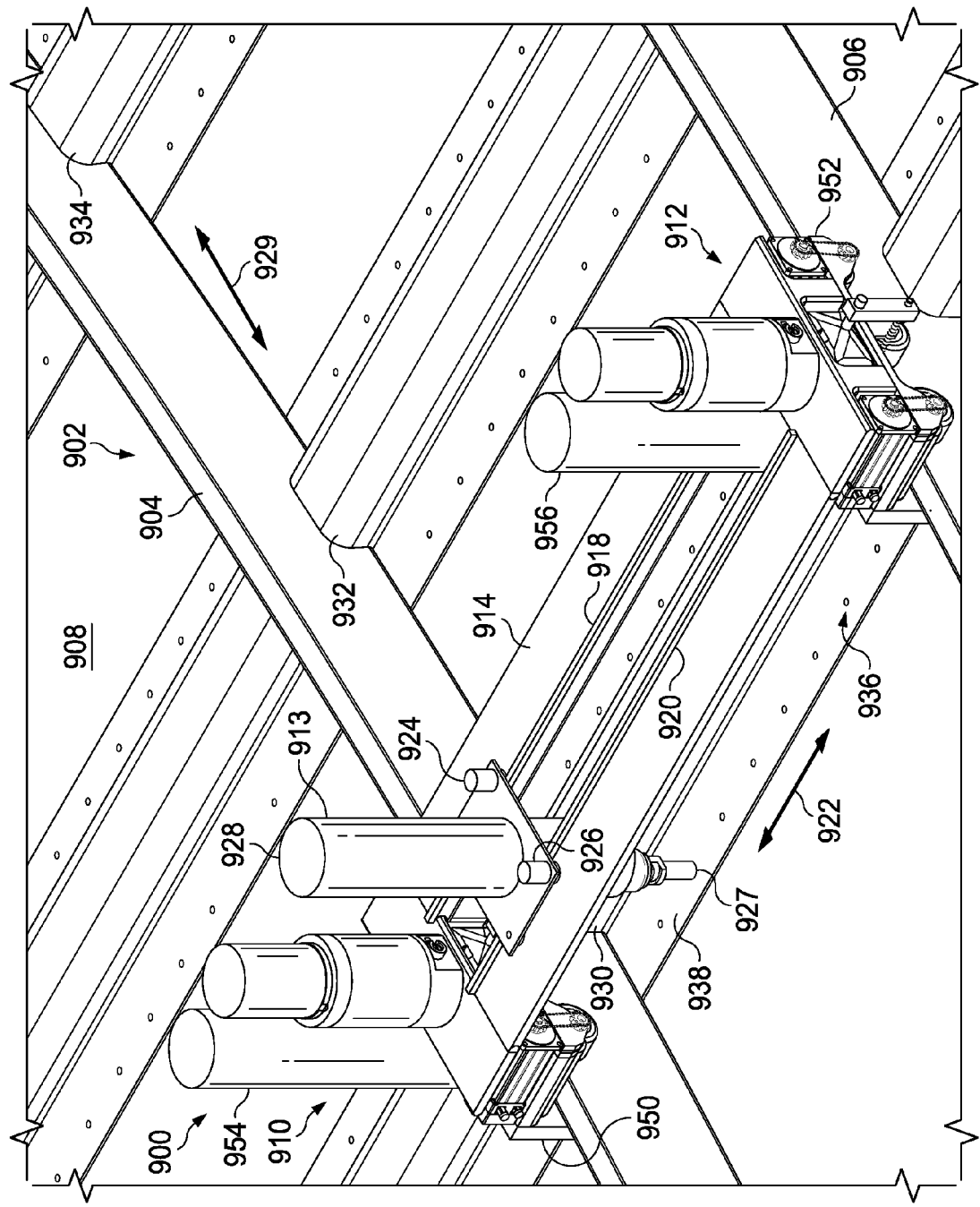
FIG. 9 is an illustration of a mobile platform in accordance with an illustrative embodiment.

Turning next to FIG. 9, an illustration of a mobile platform is depicted in accordance with an illustrative embodiment. In this illustrative example, mobile platform 900 in automated environment 902 is depicted as being attached to first elongate frame 904 and second elongate frame 906. First elongate frame 904 and second elongate frame 906 may be attached to skin panel 908. First elongate frame 904 and second elongate frame 906 may be temporarily attached such that fasteners (not shown) may be installed. First elongate frame 904 and second elongate frame 906 may be substantially parallel to each other.

In this illustrative example, mobile platform 900 may be comprised of first crawler 910, second elongate frame 906, tool 913, and connector 914. First crawler 910 and second crawler 912 may be examples of crawler 120 shown in block form in FIG. 1. In particular, first crawler 910 and second crawler 912 may be implemented using crawler 212 in FIG. 3.

As depicted, connector 914 may connect first crawler 910 and second crawler 912 to each other to form mobile platform 900. Connector 914 also may function as a support structure.

For example, connector 914 may provide support for tool 913. Tool 913 may be configured to move along connector 914. In particular, tool 913 may move along rail 918 and rail 920 on connector 914 in the direction of arrow 922. As depicted, motor 924 and motor 926 may move tool 913 along rail 918 and rail 920, respectively, in the direction of arrow 922. This type of movement in the direction of arrow 922 may be longitudinal with respect to first elongate frame 904 and second elongate frame 906. In other words, tool 913 may move longitudinally between first crawler 910 and second crawler 912.

Tool 913 may be an example of a tool in tool system 122 shown in block form in FIG. 1. In particular, tool 913 may be implemented using tool system 304 as depicted in FIG. 3. As depicted, tool 913 may include fastener installer 927 and supply unit 928.

As depicted, first crawler 910 and second crawler 912 may move mobile platform 900 on first elongate frame 904 and second elongate frame 906 in the direction of arrow 929. As depicted, first crawler 910 may perform operations along first elongate frame 904 and portions of skin panel 908 within reach of first crawler 910. Second crawler 912 may perform operations along second elongate frame 906 and portions of skin panel 908 within reach of second crawler 912.

Additionally, in these illustrative examples tool 913 may perform operations between first elongate frame 904 and second elongate frame 906. In this illustrative example, the operation may be a fastening operation. Of course, other operations that may be performed in addition to or in place of fastening operations include at least one of a drilling operation, a sealing operation, a painting operation, an inspection operation, or some other suitable operation. The different operations may be performed depending on the tool or tools used to implement tool 913.

In one illustrative example, these operations may be performed on at least one of stringer 930, stringer 932, and stringer 934. These stringers may be examples of structure 118 in FIG. 1. As depicted, fastener installer 927 in tool 913 is positioned to install fasteners (not shown) in holes 936 in flange 938 of stringer 930.

In this illustrative example, first crawler 910 may comprise first movement system 950, and second crawler 912 may comprise second movement system 952. Further, first crawler 910 also may comprise first tool 954, and second crawler 912 may also comprise second tool 956. In other words, first tool 954, second tool 956, or both may be used in addition to tool 913. These three tools may form tool system 122 shown in block form in FIG. 1 and tool 913 may be referred to as a third tool. In some illustrative examples, at least one of first tool 954 or second tool 956 may be omitted.

Figure 10:
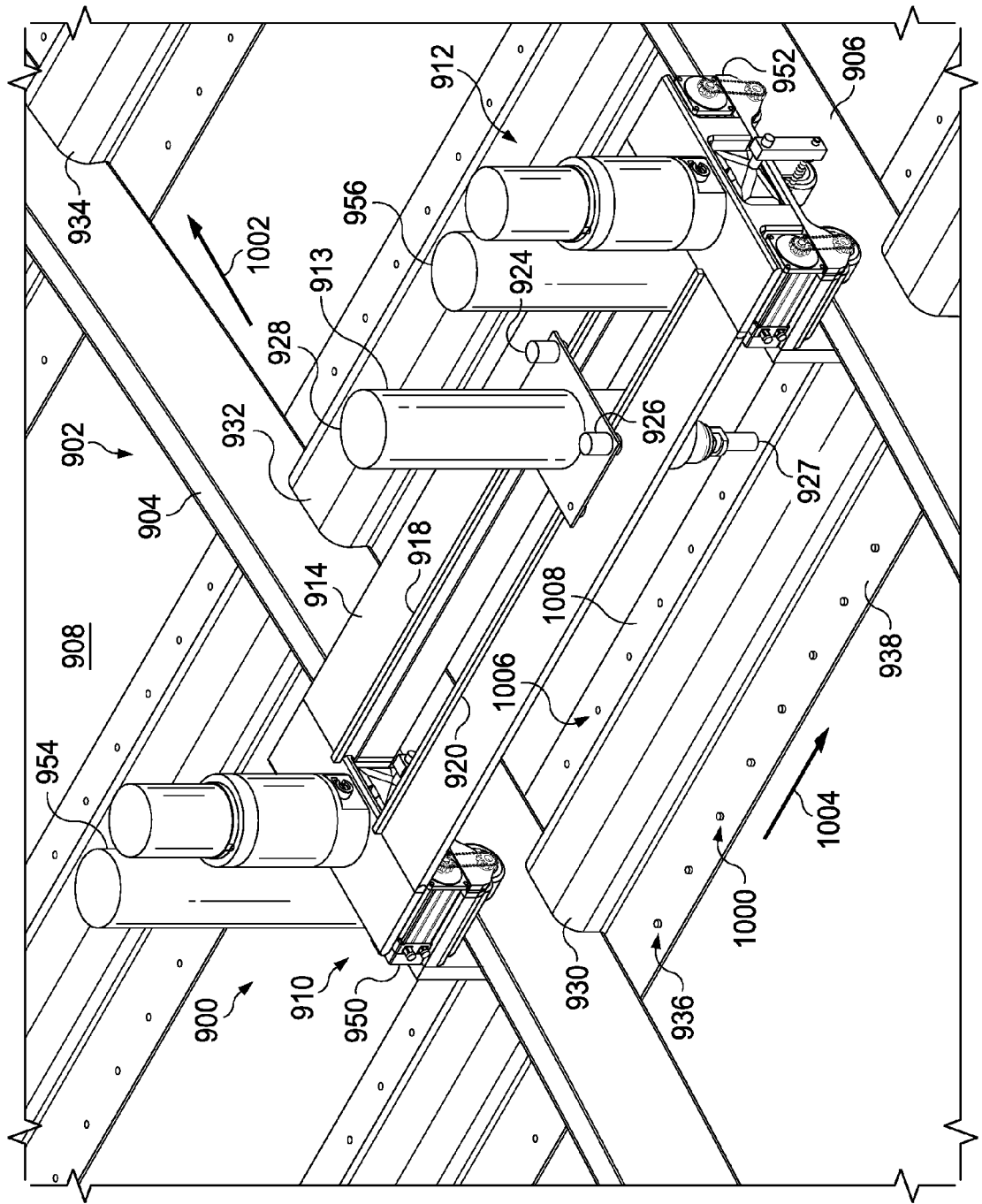
FIG. 10 is another illustration of a mobile platform in accordance with an illustrative embodiment.

With reference now to FIG. 10, another illustration of a mobile platform is depicted in accordance with an illustrative embodiment. In this example, fasteners 1000 are shown as installed in holes 936 in flange 938 of stringer 930.

As depicted, mobile platform 900 has moved in the direction of arrow 1002 and in the direction of arrow 1004. As depicted, fastener installer 927 may install fasteners (not shown) in holes 1006 in flange 1008 of stringer 930.

In this manner, mobile platform 900 may perform operations on at least one of first elongate frame 904, second elongate frame 906, stringer 930, stringer 932, and stringer 934, as well as areas adjacent to and/or between first elongate frame 904 and second elongate frame 906.

The illustrations of mobile platform 211 in FIGS. 2-7, mobile platform 213 in FIG. 3, and mobile platform 800 in FIG. 8 are not meant to imply limitations to the manner in which mobile platform 110 shown in block form in FIG. 1 may be implemented. For example, other numbers of crawlers may be connected using other numbers of connectors in addition to or in place of crawler 810 and crawler 812, connected to each other by connector 814 in FIG. 8. Further, some mobile platforms may use other forms of locomotion other than rollers. For example, other mobile platforms may use tracks, wheels, feet, movable suction cups, or other suitable types of locomotion devices.

In yet other illustrative examples, first crawler 910 and second crawler 912 may be replaced with attachment devices. For example, a first attachment device may be connected to first elongate frame 904 and a second attachment device may be connected to second elongate frame 906. In this example, connector 914 may connect the first attachment device and the second attachment device to each other such that tool 913 may move longitudinally between first elongate frame 904 and second elongate frame 906 and perform operations between first elongate frame 904 and second elongate frame 906.

As another example, the illustration of mobile platform 900 may vary in other illustrative examples. For example, first crawler 910, second crawler 912 or both may exclude tools. Instead, mobile platform 900 may only include tool 913. As yet another example, the operations performed by tool 913 in mobile platform 900 in FIG. 9 and FIG. 10 may be performed on other structures other than stringer 930, stringer 932, and stringer 934. For example, operations may be performed by tool 913 on other structures, such as a pipe, a cable, a harness, a panel or other structure that may be located between first elongate frame 904 and second elongate frame 906.

The different components shown in FIGS. 2-10 may be combined with components in FIG. 1, used with components in FIG. 1, or a combination of the two. Additionally, some of the components in FIGS. 2-10 may be illustrative examples of how components shown in block form in FIG. 1 can be implemented as physical structures.

As another illustrative example, although the different operations have been depicted with respect to performing operations on a skin panel with elongate frames, the different operations may be performed on other structures. For example, the elongate frames may be located on a barrel for a fuselage of the aircraft. The barrel may be a composite barrel and the elongate frames may be metal elongate frames, composite elongate frames, or some combination thereof. As another example, elongate frames may be located on a floor of an object, such as an aircraft.

Figure 11:
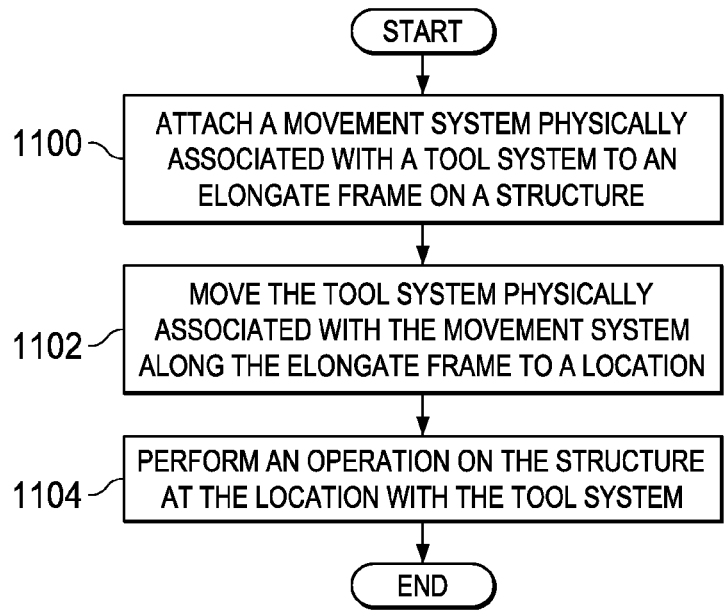
FIG. 11 is an illustration of a flowchart of a process for performing an operation on a structure in accordance with an illustrative embodiment.

With reference now to FIG. 11, an illustration of a flowchart of a process for performing an operation on a structure is depicted in accordance with an illustrative embodiment. The process illustrated in FIG. 11 may be implemented in automated environment 100. In particular, the process may be implemented using automated system 108 including mobile platform 110.

The process begins by attaching movement system 124 physically associated with tool system 122 to elongate frame 116 on structure 118 (operation 1100). In this illustrative example, movement system 124 and tool system 122 may be components in mobile platform 110, such as crawler 120.

Tool system 122 physically associated with movement system 124 may be moved along elongate frame 116 to location 130 (operation 1102). The process then may perform operation 128 on structure 118 at location 130 with tool system 122 (operation 1104), with the process terminating thereafter.

Figure 12:
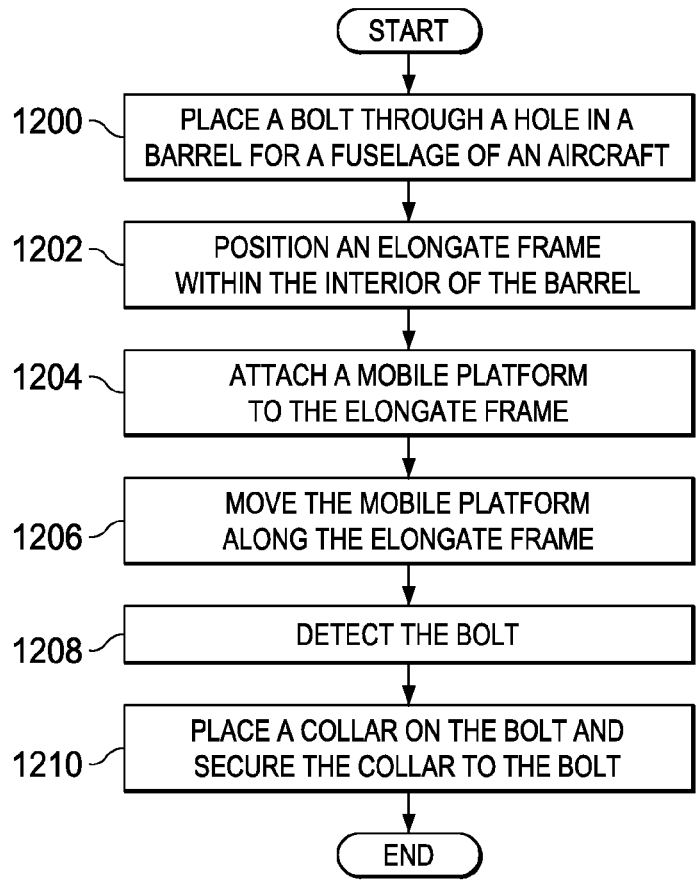
FIG. 12 is an illustration of a flowchart of a process for manufacturing aircraft in accordance with an illustrative embodiment.

Turning next to FIG. 12, an illustration of a flowchart of a process for manufacturing aircraft is depicted in accordance with an illustrative embodiment. The process illustrated in FIG. 12 may be implemented in automated environment 100 to perform operations 102 on structures 104 for aircraft 114. Structures 104 may include, for example, structures for a fuselage of aircraft 114, such as a barrel of a fuselage.

The process begins by placing a bolt through a hole in a barrel for a fuselage of an aircraft (operation 1200). The bolt may be placed through the hole from outside of the barrel. The barrel may be an example of structure 118 in FIG. 1. The fastener may be a first fastener element in a fastener system.

Thereafter, an elongate frame may be positioned within the interior of the barrel (operation 1202). The elongate frame may be configured for providing structural support within the barrel.

The process attaches a mobile platform to the elongate frame (operation 1204). In this illustrative example, the mobile platform may be, for example, crawler 120 in FIG. 1.

Next, the mobile platform is moved along the elongate frame (operation 1206). The process then detects the bolt (operation 1208). The detection of the bolt may be performed using at least one of a sensor, such as a camera, an encoder, or some other suitable type of sensor.

Thereafter, an operation is performed to place a collar on the bolt and secure the collar to the bolt (operation 1210), with the process terminating thereafter. The collar may be a second fastener element in the fastener system.

The different operations in FIG. 12 may be performed for any number of locations along the elongate frame where fasteners may be present. In this manner, the elongate frame may be used as a track by the mobile platform for fastening operations. As a result, a separate track that is connected to the barrel and removed from the barrel is unnecessary. In this manner, the amount of time and effort needed to perform fastening operations in manufacturing aircraft may be reduced.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, although the different operations in FIG. 12 were described with respect to installing collars on bolts, these operations may be applied to types of components. For example, the process may install a bolt and a collar, a nut, a rivet, or some other suitable type of fastener. Further, the different illustrative embodiments also may include operations to identify a type or size of fastener for use.

Figure 13:
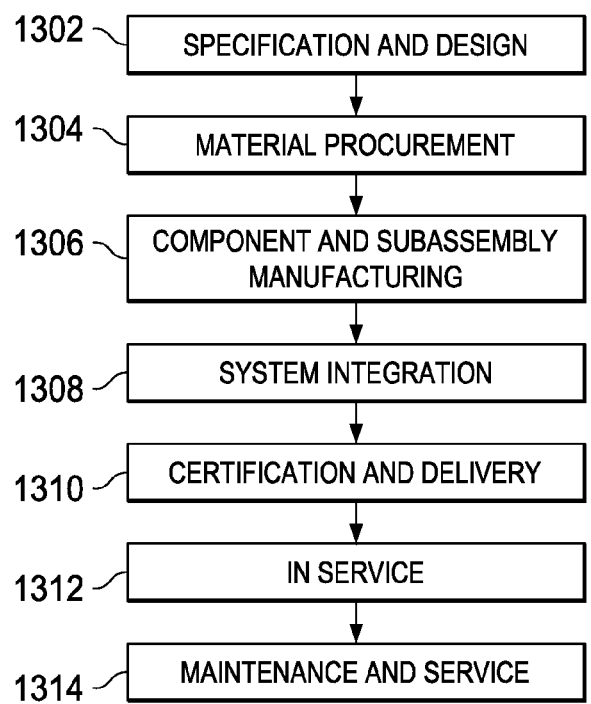
FIG. 13 is an illustration of a block diagram of an aircraft manufacturing and service method in accordance with an illustrative embodiment.
Figure 14:
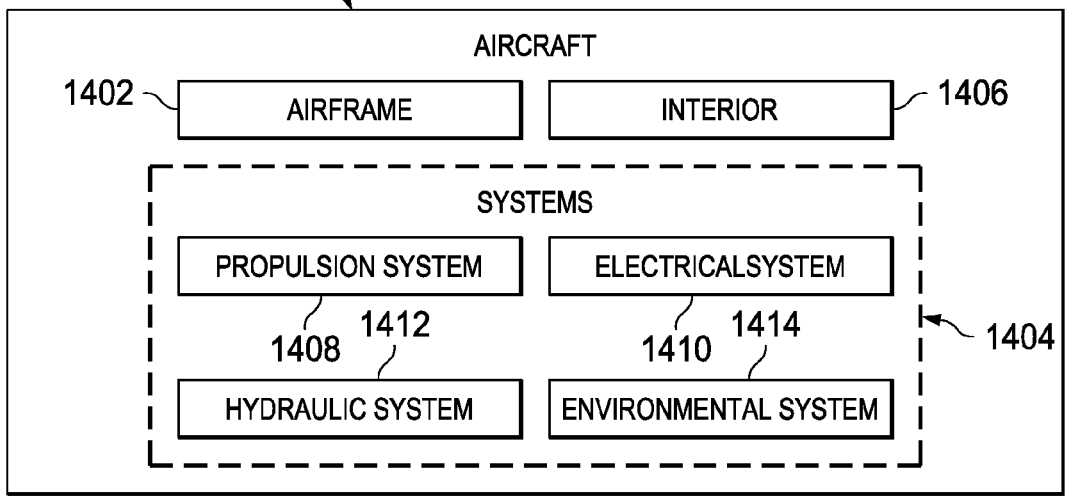
FIG. 14 is an illustration of a block diagram of an aircraft in which an illustrative embodiment may be implemented.

The illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312 and/or during maintenance and service 1314 in FIG. 13. The use of a number of the different illustrative embodiments may substantially expedite the assembly of and/or reduce the cost of aircraft 1400.

For example, the illustrative embodiments may be implemented during component and subassembly manufacturing 1306 attached to elongate frames to structures such as barrels, skin panels, and other suitable structures for aircraft 1400. In still other illustrative examples, the illustrative embodiment may be implemented to perform other operations during component and subassembly manufacturing 1306 such as sealing, painting, drilling holes, and other suitable operations. These and other operations also may be performed during system integration 1308 when different components may be connected to other components. Further, the illustrative embodiments may be used during maintenance and service 1314 to perform operations. The different operations may be performed on structures during routine maintenance, inspection, refurbishment, upgrades, and other processes that may occur during maintenance and service 1314.

Thus, one or more illustrative embodiments may be used to manufacture and perform other operations for structures on objects such as aircraft. The illustrative embodiments may be used to reduce the man-made equipment needed to perform different operations. For example, with an illustrative embodiment, a track system is not needed to provide a guide or attachment for the mobile platform that forms different operations. Additionally, less time and effort may be needed to perform these operations since the attachment and removal of a track may be unnecessary.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a robotic crawler capable of moving along an elongate frame on a structure to perform an operation, the robotic crawler comprising:
a guide configured to be situated on a side of the elongate frame having a wheel assembly comprising a wheel and a sphere; wherein the sphere is situated within the wheel, the sphere being configured to contact and move along the side of the elongate frame, and the wheel being configured to contact and move along a surface of the elongate frame;
a movement system configured to move the robotic crawler to a location along the elongate frame; and
a system configured to perform the operation on the structure at the location.

2. The apparatus of claim 1, further comprising:
a support frame in which the system and the movement system are physically associated with the support frame.

3. The apparatus of claim 1, wherein the movement system comprises:
a locomotion system configured to move along the elongate frame; and
an attachment system configured to attach the locomotion system to the elongate frame.

4. The apparatus of claim 3, wherein the locomotion system comprises:
a number of rollers configured to contact the elongate frame; and
a number of motors configured to turn at least one of the number of rollers such that the movement system and the system move along the elongate frame.

5. The apparatus of claim 3, wherein the attachment system is selected from at least one of a physical clamping system or a magnetic attachment system.

6. The apparatus of claim 1, wherein the system is comprised of at least one of a fastener installer, a drill, a paint applicator, a sealant applicator, or a camera.

7. The apparatus of claim 1, wherein the elongate frame is curved.

8. The apparatus of claim 1, wherein the elongate frame has a section extending from the surface of the structure in which the section is substantially perpendicular to the surface and a flange extending from an edge of the section in which the flange is substantially perpendicular to the edge of the section.

9. The apparatus of claim 1, wherein the structure and the elongate frame are part of a fuselage of an aircraft.

10. The apparatus of claim 1, wherein the structure and the elongate frame are located in an object selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, or a building.

11. The apparatus of claim 1, wherein the elongate frame is a first elongate frame, the crawler is a first crawler, and the movement system comprises:
a second crawler configured to move on a second elongate frame; and
a connector connecting the first crawler to the second crawler, wherein a tool in the system is configured to move along the connector between the first crawler and the second crawler.

12. The apparatus of claim 1, wherein the system includes a first tool associated with the first crawler and a second tool associated with the second crawler.

13. The apparatus of claim 1, wherein the structure is selected from one of a flange on the elongate frame, a skin panel, a spar, a rib, and a stringer.

14. The apparatus of claim 1, wherein:
the guide is a second guide, the side is a second side of the elongate frame, and the sphere is a first sphere;
the apparatus further comprising:
a first guide configured to be situated on a first side of the elongate frame opposite the first side, the second guide comprising:
a screw drive configured to move the second guide relative to the elongate frame to engage or disengage the robotic crawler to the elongate frame.

15. The apparatus of claim 14, further comprising:
a sensor system configured to detect a location of a bolt;
wherein the movement system is configured to engage the elongate frame to move the robotic crawler to the location of the bolt; and
wherein the system is configured to place a collar on the bolt to secure the elongate frame to a skin panel of the structure.

16. The apparatus of claim 1, further comprising:
a clamping system configured to removably secure the robotic crawler to the elongate frame.

17. A method comprising:
securing a robotic crawler to an elongate frame of a structure, wherein the robotic crawler comprises:
a guide configured to be situated on a side of the elongate frame having a wheel assembly comprising a wheel and a sphere; wherein the sphere is situated within the wheel, the sphere being configured to contact and move along the side of the elongate frame, and the wheel being configured to contact and move along a surface of the elongate frame;
a movement system configured to move the robotic crawler along the elongate frame, and
a tool system configured to perform an operation on the structure; and
moving the robotic crawler along the elongate frame to a location to perform the operation.

18. The method of claim 17, further comprising:
attaching the movement system to the elongate frame, wherein the movement system moves on the elongate frame.

19. The method of claim 17, wherein the operation is selected from one of a fastener installation operation, a drilling operation, a sealing operation, a painting operation, or an inspection operation.

20. The method of claim 17, wherein the tool system and the movement system are physically associated with a support frame.

21. The method of claim 17, further comprising:
attaching the movement system to the elongate frame, wherein the movement system comprises a locomotion system configured to move along the elongate frame and an attachment system configured to attach the locomotion system to the elongate frame.

22. The method of claim 21, wherein the locomotion system comprises:
a number of rollers configured to contact the elongate frame; and
a number of motors connected to at least one of the number of rollers and configured to turn at least one of the number of rollers such that the movement system and the tool system move along the elongate frame.

23. The method of claim 21, wherein the attachment system is selected from at least one of a physical clamping system or a magnetic attachment system.

24. The method of claim 17, wherein the tool system is comprised of at least one of a fastener installer, a drill, a paint applicator, a sealant applicator, or a camera.

25. The method of claim 17, wherein the elongate frame is curved.

26. The method of claim 17, wherein the elongate frame has a section extending from the surface of the structure in which the section is substantially perpendicular to the surface and a flange extending from an edge of the section in which the flange is substantially perpendicular to the edge of the section.

27. The method of claim 17, wherein the structure is selected from one of a flange on the elongate frame, a skin panel, a spar, a rib, and a stringer.

28. The method of claim 17, wherein the structure and the elongate frame are located in a platform selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, or a building.

29. A mobile tool system comprising:
a crawler comprising:
a tool system configured to perform an operation at a location on a structure for a fuselage of an aircraft in which the tool system is comprised of at least one of a fastener installer, a drill, a paint applicator, a sealant applicator, or a camera;
a movement system configured to move the tool system along an elongate frame on the structure to the location, the movement system comprising a locomotion system configured to move along the elongate frame and an attachment system configured to attach the locomotion system to the elongate frame in which the locomotion system has a number of rollers configured to contact the elongate frame and a number of motors configured to turn at least one of the number of rollers such that the movement system and the tool system move along the elongate frame and in which the attachment system is a clamping system; and
a support frame in which the tool system and the movement system are physically associated with the support frame; and
a controller configured to control operation of the crawler;
wherein the clamping system is configured to removably secure the support frame to the elongate frame, the clamping system comprising:
a guide configured to be situated on a side of the elongate frame having a wheel assembly comprising a wheel and a sphere; wherein the sphere is situated within the wheel, the sphere being configured to contact and move along the side of the elongate frame, and the wheel being configured to contact and move along a surface of the elongate frame.

30. A method for performing an operation on a structure in a fuselage of an aircraft, the method comprising:
attaching a movement system in a crawler to an elongate frame in which the movement system moves on the elongate frame in which the movement system is physically associated with a tool system in the crawler, in which the tool system and the movement system are physically associated with a support frame for the crawler in which the movement system comprises a locomotion system configured to move along the elongate frame and an attachment system configured to attach the locomotion system to the elongate frame in which the locomotion system has a number of rollers configured to contact the elongate frame and a number of motors configured to turn at least one of the number of rollers such that the movement system and the tool system move along the elongate frame; in which the attachment system is a clamping system; and in which the tool system is comprised of at least one of a fastener installer, a drill, a paint applicator, a sealant applicator, or a camera;

moving the tool system physically associated with the movement system along the elongate frame on the structure to a location; and performing the operation on the structure at the location with the tool system in which the operation is selected from one of a fastener installation operation, a drilling operation, a sealing operation, a painting operation, or an inspection operation;

wherein the clamping system is configured to removably secure the support frame to the elongate frame, the clamping system comprising:

a guide configured to be situated on a side of the elongate frame having a wheel assembly comprising a wheel and a sphere; wherein the sphere is situated within the wheel, the sphere being configured to contact and move along the side of the elongate frame, and the wheel being configured to contact and move along a surface of the elongate frame.

\* \* \* \* \*